U.S. Patent Number: 5,143,159
Date of Patent: Sep. 1, 1992

United States Patent [19]
Young et al.

[54] DRAFT CONTROL SYSTEM WITH DUAL MODE DRAFT SENSITIVITY

[75] Inventors: Steven C. Young, Lancaster; Bradley A. Nielsen, New Holland, both of Pa.; Matthew T. Miller, Waterloo, Iowa

[73] Assignee: Ford New Holland, Inc., New Holland, Pa.

[21] Appl. No.: 709,185

[22] Filed: Jun. 3, 1991

[51] Int. Cl.$^5$ ............................................. A01B 63/112
[52] U.S. Cl. ........................................ 172/8; 172/7; 364/424.07
[58] Field of Search ................. 172/7, 8, 1, 2; 364/424.07; 37/234, DIG. 1, DIG. 20

[56] References Cited

U.S. PATENT DOCUMENTS

| | | | |
|---|---|---|---|
| 4,132,272 | 1/1979 | Hollaway et al. | 172/2 |
| 4,132,273 | 1/1979 | Mortensen | 172/7 |
| 4,300,638 | 11/1981 | Katayama et al. | 172/7 |
| 4,343,365 | 10/1982 | Rajagopal et al. | 172/7 |
| 4,385,353 | 5/1983 | Schneider | 172/2 |
| 4,437,048 | 3/1984 | Arnold | 172/7 |
| 4,495,577 | 1/1985 | Strunk et al. | 172/7 |
| 4,508,176 | 4/1985 | Wiegart et al. | 172/7 |
| 4,518,044 | 5/1985 | Wiegardt et al. | 172/7 |
| 4,571,500 | 2/1986 | Mucheyer | 172/7 |
| 4,679,633 | 7/1987 | Kauss | 172/1 |
| 4,796,712 | 1/1989 | Rutkowski et al. | 172/4 |
| 4,807,136 | 2/1989 | Rutkowski | 172/7 |
| 4,837,691 | 6/1989 | Boe et al. | 172/7 |
| 4,846,283 | 7/1989 | Batcheller | 172/1 |
| 4,878,543 | 11/1989 | Kauss | 172/7 |
| 4,886,123 | 12/1989 | Arnold et al. | 172/7 |
| 4,924,943 | 5/1990 | Maichle | 172/1 |
| 4,931,967 | 6/1990 | Boe et al. | 364/571.01 |
| 4,969,527 | 11/1990 | Boe et al. | 172/2 |
| 5,012,415 | 4/1991 | Boe et al. | 172/7 |

FOREIGN PATENT DOCUMENTS

| | | | |
|---|---|---|---|
| 3240278 | 5/1984 | Fed. Rep. of Germany | 172/7 |
| 1134124 | 1/1985 | U.S.S.R. | 172/7 |

OTHER PUBLICATIONS

SAE Technical Paper 891835 entitled Tractor Three-Point Hitch Control System.
SAE Technical Paper 901561 entitled Development of the Electronic Draft Control System for the Ford New Holland 8210 Tractor.

*Primary Examiner*—Dennis L. Taylor
*Assistant Examiner*—Spencer Warnick
*Attorney, Agent, or Firm*—Griffin, Branigan & Butler

[57] ABSTRACT

A tractor-mounted three-point hitch for pulling a tillage implement is controlled by a closed loop including draft sensors for sensing the draft on the hitch and providing a draft feedback signal. An operator-controlled quadrant lever provides command signals for commanding the positioning of the hitch relative to the ground. During rapid hitch movement commanded by movement of the quadrant lever while the implement is above the ground, the draft feedback signal, which is normally filtered to eliminate frequencies above about 3.2 Hz, is more heavily filtered to eliminate frequencies above 0.5 Hz. This makes the loop less sensitive to the draft feedback signal and reduces vibrations which would otherwise occur because of oscillations in the draft feedback signal. The oscillations are caused by interaction of the weight of the implement bouncing because of the pneumatic tires on the tractor, and movement of the hitch to correct for the apparent change in draft. As the hitch approaches the commanded position the system reverts to the normal filtering so that the system is more sensitive to the draft feedback signal.

13 Claims, 5 Drawing Sheets

DRAFT CONTROL SYSTEM WITH DUAL MODE DRAFT SENSITIVITY

RELATED APPLICATIONS

This application is related to the following commonly owned and concurrently filed applications, the disclosures of which are incorporated herein by reference.

Application B Ser. No. 07/709,237 for Wheel Speed Calibration and Slip Override Disable Application C Ser. No. 07/709,256 for Draft Control System With Safety Disconnect Application D Ser. No. 07/709,184, now abandoned for Draft Control System With Closed Loop/Raise Rate Control

FIELD OF THE INVENTION

The present invention relates to an automatic draft control system for controlling the positioning of a hitch to which an implement, such as a plow, is attached. More particularly, this invention relates to improvements in electronic draft control systems of the type disclosed by Macqueene et al. in SAE Technical Paper No. 901561 entitled Development of the Electronic Draft Control System for the Ford New Holland 8210 Tractor.

BACKGROUND OF THE INVENTION

The aforementioned technical paper describes a microprocessor-based automatic draft control system for a three-point hitch. A tillage implement is attached to the hitch and the hitch is mounted at the rear of a tractor having pneumatic tires. A single quadrant lever, located in the tractor cab, is manually moved by the operator to generate position/draft commands which cause raising or lowering of the hitch. Draft sensors sense the draft on the hitch and a position sensor senses the position of the hitch, the sensors producing feedback signals to the microprocessor. The microprocessor responds to the position/draft commands and the feedback signals from the sensors by generating output signals for adjusting the position of the hitch.

While the system described above works quite well, it has an undesirable characteristic in that fore and aft pitching of the tractor may occur when the implement is above the ground and the quadrant lever is moved to rapidly raise or lower the hitch. Because of its pneumatic tires, the tractor acts as a spring-mass system. Furthermore, as the position and velocity of the hitch changes the weight of the implement is reflected at the draft sensors as an apparent change in draft and the draft sensors falsely indicate the draft. The microprocessor responds to the draft sensor signals by producing an output signal to correct the hitch position. Meanwhile, because of the bounce of the spring-mass system, the apparent draft, as seen by the draft sensors changes. Thus, oscillating draft feedback signals are generated and as the microprocessor responds to the signals by moving the hitch, the pitching motion is propagated and an undesirable vibration of the tractor occurs.

SUMMARY OF THE INVENTION

An object of the present invention is to provide a novel method and apparatus for reducing or eliminating tractor vibrations resulting from movements of a hitch supported implement.

A further object of the invention is to provide an improvement in automatic draft control systems wherein draft feedback sensor signals are heavily filtered only during intervals when the hitch is above ground and being repositioned so as to eliminate feedback signal variations resulting from the weight of the hitch acting against the sensors Another object of the invention is to provide, in a system for controlling positioning of a hitch supporting an implement, the hitch being mounted on a vehicle having pneumatic tires whereby the vehicle bounces as the hitch is rapidly moved while the implement is above ground, the system including means for producing a command signal representing a desired position of the hitch, and a feedback loop including draft sensing means for sensing the draft on the hitch and producing a draft feedback signal, error determining means responsive to the draft feedback signal and the command signal for producing an error signal for controlling movement of the hitch, a method of eliminating vehicle vibrations during movement of the hitch while the implement is above ground, the method comprising:

low pass filtering the draft feedback signal before applying it to the error determining means to eliminate therefrom signal variations caused by the weight of the hitch and implement variably acting on the draft sensing means as the vehicle bounces.

Another object of the invention is to provide a method as described above wherein the filtering of the draft signal is initiated only when the command signal rapidly changes, and is terminated as the hitch position approaches the desired position.

Still another object of the invention is to provide a method as described above wherein low pass filtering of the draft feedback signal is inhibited when the implement is in contact with the ground.

A further object of the invention is to provide a selectively operable filter circuit responsive to rapid changes in a hitch position command for heavily filtering a draft feedback signal before it is used to modify the position command, and a circuit for determining when a hitch approaches the position commanded and rendering the filter circuit inoperative to filter the draft feedback signal.

Other objects of the invention and its mode of operation will become apparent upon consideration of the following description and the accompanying drawings.

DETAILED DESCRIPTION OF THE INVENTION

Figure 1:
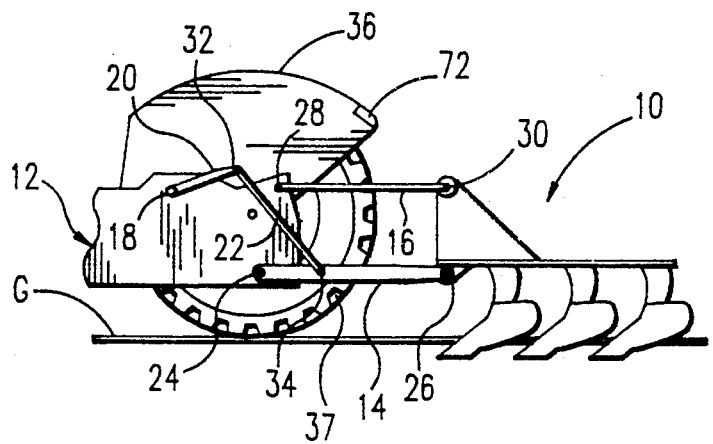
FIG. 1 illustrates a tractor-mounted hitch having a tillage implement attached thereto.

FIG. 1 illustrates a three-point hitch connecting a moldboard plow or other tillage implement 10 to the rear of a tractor 12. The hitch comprises left and right lower links 14 (FIG. 2), an upper link 16, a rock-shaft 18 having crank arms 20 affixed thereto, and left and right adjustable links 22.

The lower links 14 are pivotally attached at one end by pins 24 to a frame member of the tractor, and at the other end links 14 are pivotally attached to the implement 10 by pins 26. Upper link 16 is pivotally attached to a frame member of the tractor by a pin 28, and pivotally attached to implement 10 by a pin 30. Each adjustable link 22 is connected at one end by a pivot pin 32 to a crank arm 20 and connected at the other end by a pivot pin 34 to an intermediate position of a lower link 14.

The position of implement 10 relative to ground G is adjusted by rotating rock-shaft 18 through an arc. In FIG. 1, as the rock-shaft 18 is rotated counter-clockwise, crank arms 20 act through adjustable links 22 to pivot lower links 14 counter-clockwise about pins 24. As link pins 26 are raised, the upper link 16 prevents the weight of the implement from pivoting the implement downwardly about pins 26, and the upper portion of the implement pivots in an arc whose center is located at pin 28.

Figure 2:
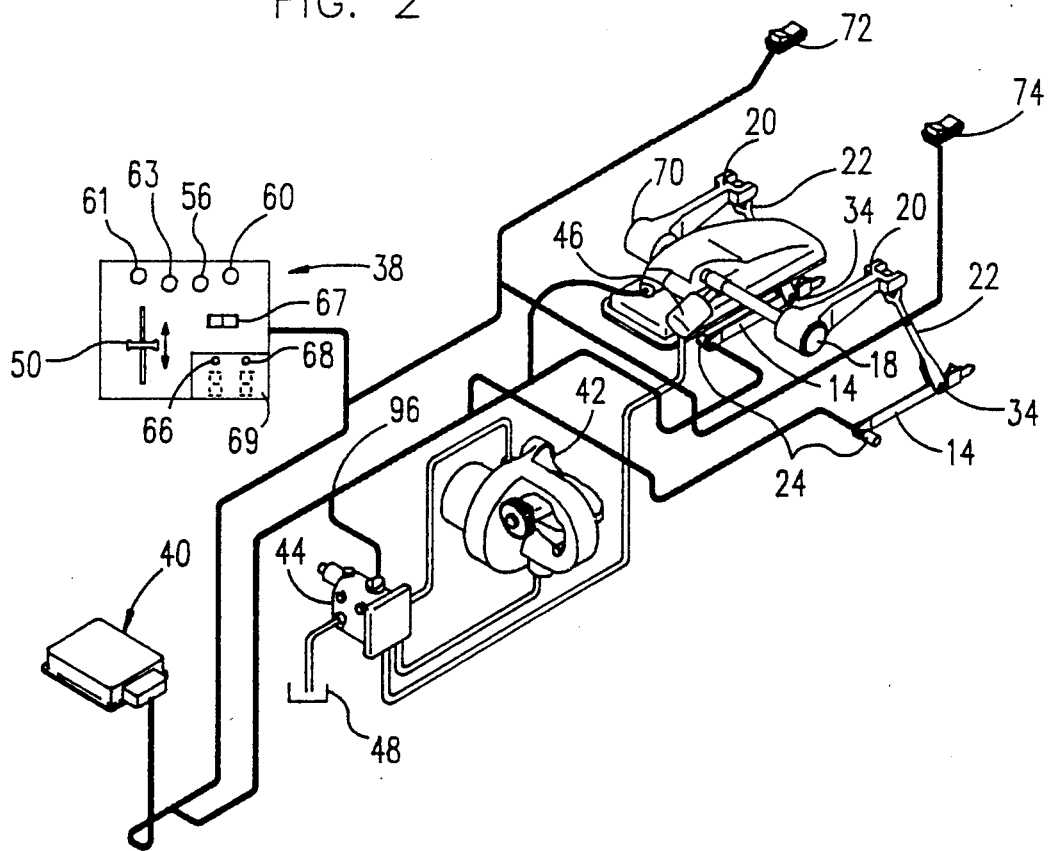
FIG. 2 is a schematic view of a three point hitch and an automatic draft control therefor.

FIG. 2 schematically illustrates an automatic draft control system for controlling the movements of the hitch by controlling movement of the rock-shaft 18. The control system includes an electronic draft control (EDC) console 38, a microprocessor 40, a pump 42, an electro-hydraulic proportional control valve 44, and a hydraulic lift cylinder 46.

Figure 3:
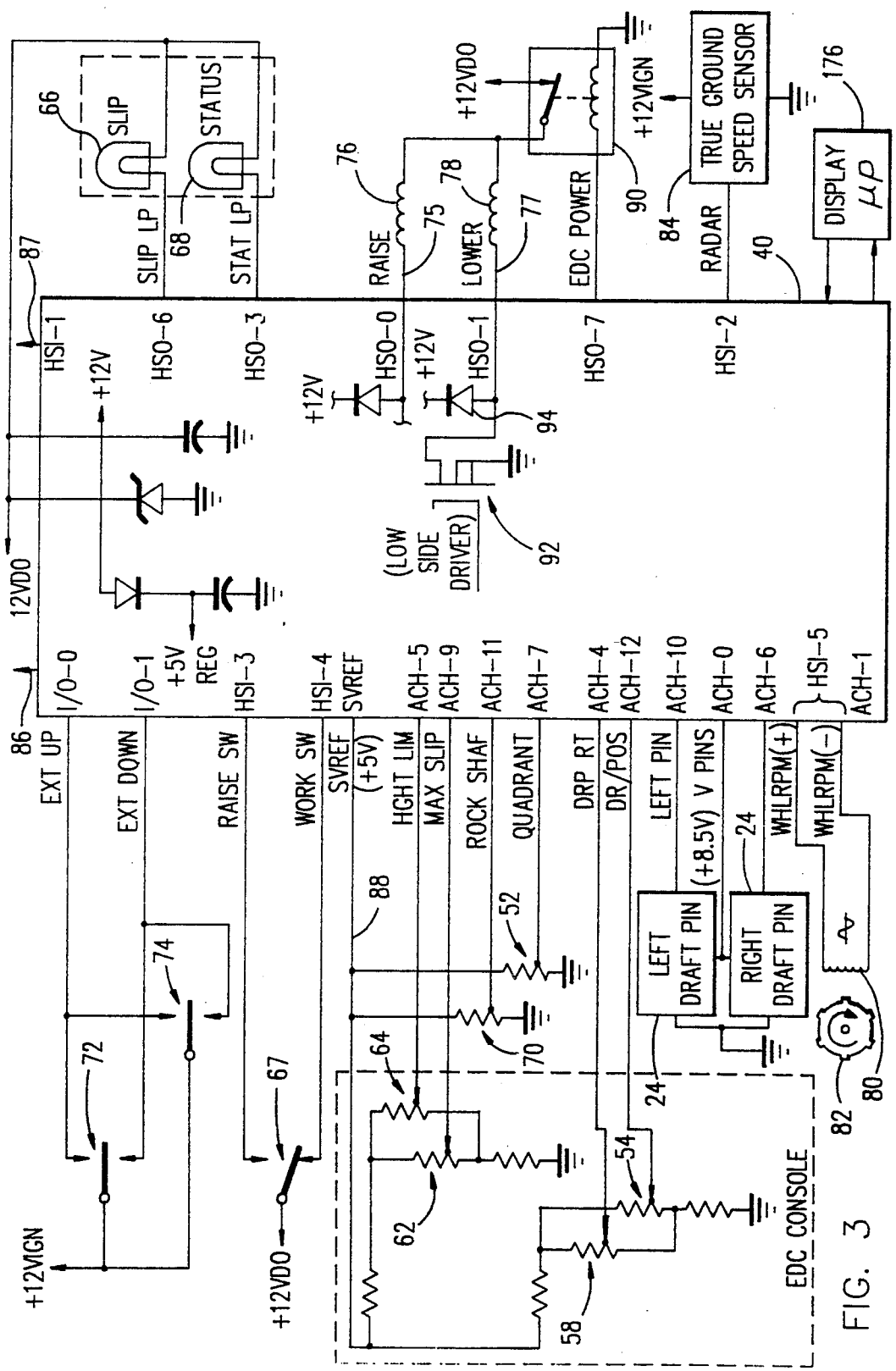
FIG. 3 illustrates the control microprocessor and inputs and outputs therefor.

The control console 38 has a hitch lift control or quadrant lever 50 which is pivoted near its lower end. As the lever 50 is moved forwardly or backwardly it actuates a potentiometer 52 (FIG. 3). The quadrant lever is used to control the positioning of the hitch. A detent (not shown) is provided for limiting forward movement of the quadrant lever 50 When the quadrant lever is moved forwardly beyond the detent, it places the control system in an open-loop or external mode which permits use of external fender-mounted switches to control positioning of the hitch.

The console also includes a position/draft mix control potentiometer 54 (FIG. 3) operated by a control knob 56 and a drop rate control potentiometer 58 operated by a control knob 60. The purpose of the control potentiometers 54 and 58 is explained below.

A digital display 69 is provided on the console to indicate the relative hitch position. In addition, the EDC console also includes a slip control knob 61 for controlling a maximum slip limit potentiometer 62, a height limit control knob 63 for controlling a height limit potentiometer 64, a slip indicator lamp 66 and an EDC status lamp 68. A work/raise rocker switch 67 is also provided on the console. This switch enables the operator to selectively raise the hitch to the height limit set by control knob 63, or lower the hitch to the position specified by the quadrant lever 50, by merely actuating the switch.

As subsequently explained, the hitch height may be controlled by a variable mix of position and draft signals. This requires that the position of the hitch and the draft be known. Therefore, a rotary potentiometer 70, driven by rock-shaft 18, is provided to sense the position of the hitch. The pivot pins 24 are load sensitive pins such as those available from the Robert Bosch company and provide a means for sensing the draft. These pins provide an electrical output signal directly related to the horizontal component of the forces on the lower links 14.

To provide for manual control of the hitch position when attaching or detaching an implement 10, two three-position rocker switches 72 and 74 are mounted on the left and right fenders 36 covering the rear tractor wheels 37. Switches 72 and 74 are rendered operable by first moving the quadrant lever 50 forwardly past the detent position to initiate an external mode of operation. While the system is in the external mode, either switch 72 or 74 may be manipulated to raise or lower the hitch. The external mode, once initiated, remains in effect until the hitch is "recaptured" i.e. the quadrant lever 50 is moved to a position which corresponds to the present hitch position.

Generally speaking, microprocessor 40 repeatedly samples the output signals from the various sensors, switches and potentiometers, and produces a pulse width modulated signal for controlling a "raise" solenoid 76 or a "lower" solenoid 78 (FIG. 3) associated with the closed center valve 44. To raise the hitch, fluid pressurized by pump 42 is passed through the valve to extend lift cylinder 46 which rotates rock-shaft 18 counter-clockwise. To lower the hitch, the "lower" solenoid is energized to dump fluid from the lift cylinder 46 through valve 44 to sump 48. The hitch falls under its own weight and rotates the rock-shaft 18 clockwise to retract the lift cylinder.

Referring now to FIG. 3, the microprocessor 40 may be an EEC-IV module of the type used by Ford Motor Company for automotive engine control. The microprocessor module comprises a type 8061 microprocessor with a 32K byte EPROM and 16×16 bit E²PROM. The module also includes a plurality of analog input channels with A/D conversion means for converting the analog input signals to digital signals for use in the microprocessor. The outputs of potentiometers 52, 54, 58, 62, 64 and 70 and the draft sensor pins 24 are connected to the analog input channels The fender switches 72 and 74 and the raise/work switch 67 are connected to digital inputs of the microprocessor.

The microprocessor 40 has a frequency input which is connected to a magnetic sensor 80. This sensor senses teeth on a gear 82 which rotates with the rear wheel axle of the tractor. The sensor produces an output signal at a frequency proportional to the rate of rotation of the axle. This signal is calibrated under zero wheel slip conditions as described in copending application B so that it may be used as a representation of wheel speed regardless of the effective rolling radius of the wheels. A doppler radar unit 84 is mounted on one side of the tractor and directed toward the ground forwardly of the unit. The radar unit senses true ground speed and applies to the microprocessor signals representing this speed. The wheel (axle) speed sensor and radar output signals are analyzed by the microprocessor to determine the degree of tractor wheel slip.

Power for the microprocessor and draft control system is derived from the battery of tractor 12. Battery power is continuously applied to microprocessor 40 over lead 86 to power a keep-alive memory in the microprocessor. This memory enables stored data and status information to be retained when the tractor ignition switch (not shown) is off. A voltage +12 VIGN is derived from the battery through the ignition switch. The battery also provides a voltage +12 VDO through a after the ignition key switch is turned off. This latter voltage is applied to a voltage regulator circuit within the microprocessor 40 to generate a regulated voltage of +5 volts. This voltage is applied to logic circuits within the microprocessor. In addition, the +5 volt signal is applied over a lead 88 to the potentiometers 52, 54, 58, 62, 64 and 70. A lead 87 is connected to the ignition switch and provides a signal to the microprocessor when the switch is closed.

Insofar as the automatic draft control is concerned, the microprocessor has only five outputs. Two of these outputs are for energizing the slip lamp 66 which is energized when the degree of wheel slip exceeds the limit as set by operator adjustment of potentiometer 62 and status lamp 68 which indicates if the automatic draft control is active or inactive. Two additional outputs are connected to one side of the raise solenoid 76 and the lower solenoid 78 associated with the lift control valve 44. The last output energizes the coil of a safety relay 90 having a normally closed contact connected between +12 VDO and the raise and lower solenoids 76 and 78.

As shown in FIG. 3, the other side of the lower solenoid 78 is connected through a low side driver 92 to ground, and through a diode 94 to +12 V. The raise solenoid 76 is similarly connected to a further low side driver (not shown). Normally, the relay 90 is not energized so that +12 V is applied through its normally closed contacts to the solenoids 76 and 78. When the hitch is to be lowered, the microprocessor produces a pulse width modulated signal that turns on the driver 92 thus establishing a circuit from +12 V through the solenoid 78 and the driver to ground. The solenoid 78 controls valve 44 so that hydraulic pressure to the lift cylinder 46 is reduced and the hitch drops because of its own weight and the weight of the implement 10. To raise the hitch, the driver for solenoid 76 is turned on to energize, the solenoid. The solenoid operates the valve so that fluid under pressure is applied to the lift cylinder from the pump 42.

From FIG. 2, it is evident that the leads 75 and 77 between the microprocessor 40 and the raise and lower solenoids 76 and 78 associated with valve 44 extend from some length through a wiring harness 96. Furthermore, it is evident from FIG. 3 that if the lead 77 should be shorted to ground, the lower solenoid 78 would be energized in the same manner as if the low side driver 92 were turned on. A similar situation exists for the raise solenoid 76 if lead 75 is shorted. As explained in copending Application C, relay 90 is provided to inhibit uncommanded movement of the hitch as a result of such shorts.

The microprocessor 40 may have additional inputs and outputs permitting it to control the tractor transmission and a tractor performance monitor but these are not shown in FIG. 3 since they are not necessary for an understanding of the present invention.

Figures 4, 4A:
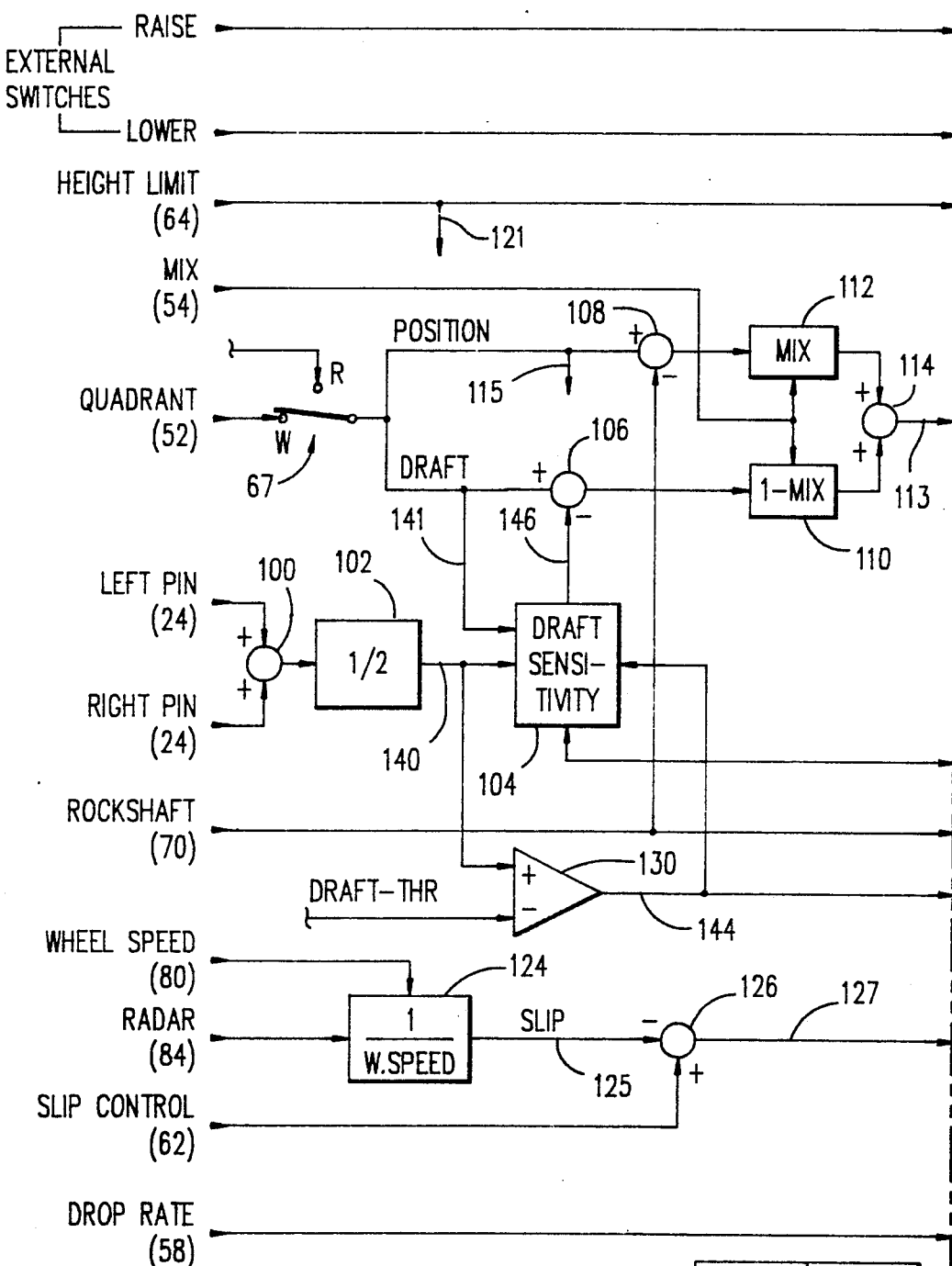
FIGS. 4A and 4B, when arranged as shown in a schematic diagram illustrating logic used in the automatic draft control.
Figure 4B:
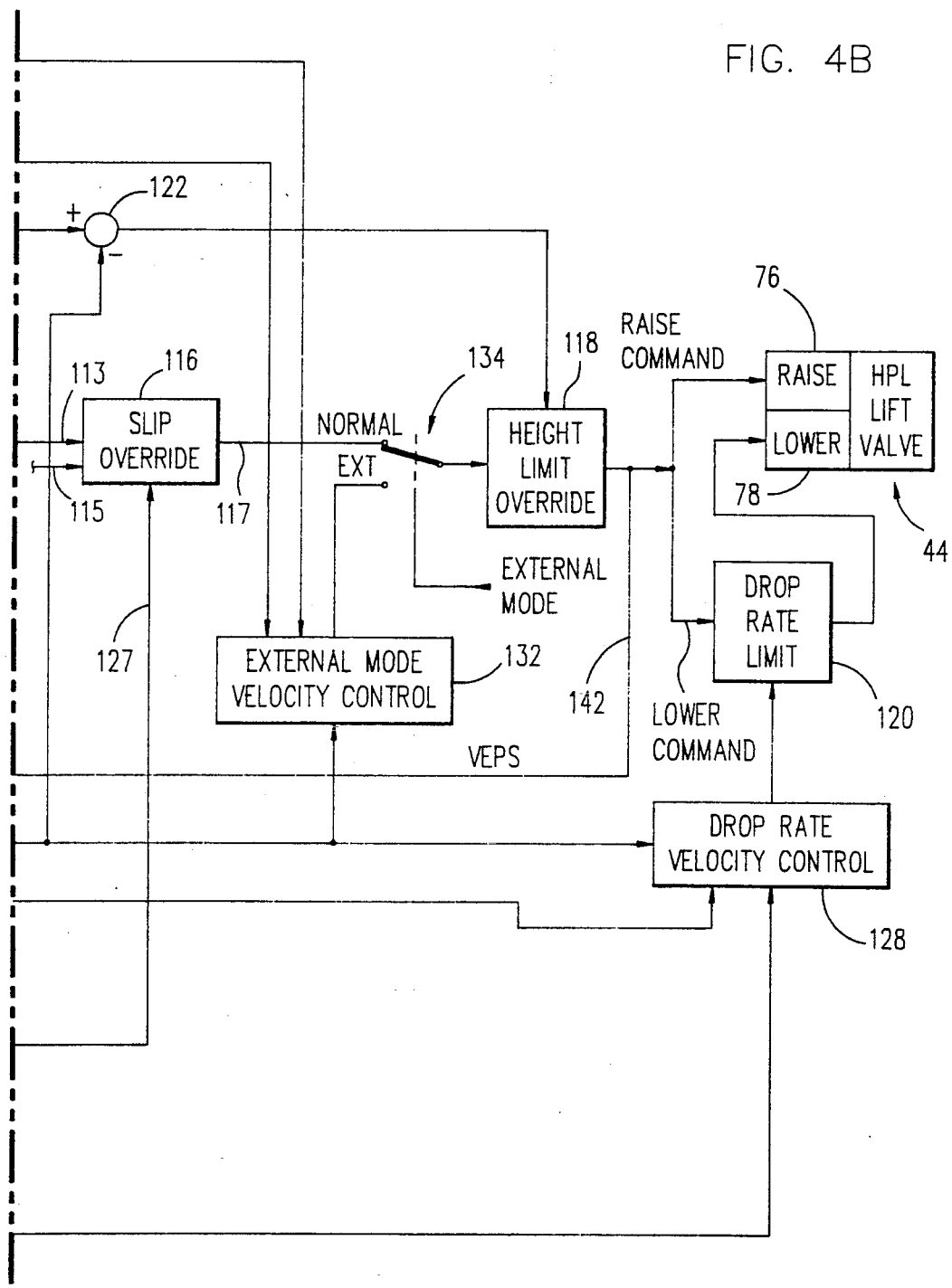

FIG. 4 is a schematic circuit diagram illustrating the logical sequence of operations performed by the program which controls microprocessor 40. These operations need not be performed by a programmed microprocessor but could also be performed by a combination of analog or digital hardware elements.

Most of the input control signals for the automatic draft control are shown at the left of FIG. 4. These signals have been derived by sensing the various potentiometers, sensors and switches and, where appropriate, digitizing the analog signals and then digitally filtering them. Furthermore, the signals may have been subjected to a scaling function prior to the time they appear as input signals in FIG. 4. These operations are conventional and thus are not shown.

After the signals from the right and left draft sensor pins 24 are digitized, compensation made for the static weight of the hitch, and low pass filtered to eliminate frequencies above about 3.2 Hz, they are added together by an adder 100 and the sum divided by 2 by a divider 102 to obtain an average composite draft feedback signal COMPDRFT_I which is applied to a draft sensitivity control 104 over a lead 140. As subsequently described, the draft sensitivity control 104 either applies the signal COMPDRFT_I directly to a subtractor 106, or low pass filters the signal before applying it to the subtractor so that frequencies above 0.5 Hz are filtered out. The purpose of the draft sensitivity control is to reduce tractor vibrations which would otherwise occur as the hitch moves in response to a change in the position of quadrant lever 50.

The quadrant lever 50 (FIG. 2) provides single-lever control of both a hitch position command and a draft command. The signal derived from the quadrant lever potentiometer 52 is applied to the raise/work switch 67 and if the switch is set to the "work" position a digitized signal (Q_EFF) is applied to the draft sensitivity control 104 over a lead 141. Q_EFF is also subjected to two different shaping functions (not illustrated) to derive a draft command which is applied to a subtractor 106 and a position command which is applied to both the subtractor 108 and a wheel slip override circuit 116. The digitized output of the rock-shaft potentiometer 70 is also applied to the subtractor 108 so that the subtractor produces an output proportional to the difference between the hitch position as commanded by the quadrant lever 50 and the actual hitch position as sensed by the rock-shaft potentiometer 70. In like manner, the output of subtractor 106 represents the difference between the draft as commanded by the quadrant lever 50 and the actual draft as sensed by the draft sensor pins 24.

The difference values obtained by subtractors 106 and 108 are fed to two mix determining circuits 110 and 112, respectively, where the output of subtractor 108 is multiplied by a mix factor determined by the setting of mix potentiometer 54. The output of the mix potentiometer is scaled to represent a value in the range of 0.3 to 1.0. The output of the subtractor 106 is multiplied by one minus the mix factor. The resulting values obtained at 110 and 112 are then summed by an adder 114.

The value derived by adder 114 may be subjected to slip override modification at 116 or height limit override modification at 118 before it is utilized to generate a pulse width modulated signal for application to the raise or lower solenoid 76 or 78 associated with the lift valve 44. In addition, if the output at 118 calls for lowering the hitch, the "lower" command may be further modified at 120 to limit the rate at which the hitch is lowered Since operation of the lift valve 44 changes the position of the hitch relative to the ground, and thus the position of the rock-shaft, and the depth to which the implement penetrates the ground affects the signals generated by draft sensor pins 24, it is seen that FIG. 4 illustrates two inter-dependent closed loops, a position feedback loop and a draft feedback loop, with the input control for both loops being derived from the quadrant lever 50 and the control signals being weighted by the setting of the mix potentiometer 54. The above-referenced SAE Technical Paper No. 901561 describes a draft/position feedback loop of this type.

The height limit potentiometer 64 enables the operator to manually select the maximum height to which the hitch may be raised. A subtractor 122 subtracts the signal derived from the rock-shaft potentiometer 70 from the signal derived from potentiometer 64. As the hitch approaches the selected height limit the raise command at the output of circuit 118 is forced to zero.

The slip override circuit 116 is controlled by the outputs of radar unit 84, wheel speed sensor 80, the draft command from the quadrant lever, and the slip control potentiometer 62. The radar unit measures true ground speed (TGS) while the sensor 80 measures nominal wheel speed. After correction of the nominal wheel speed value as subsequently described, the true ground speed is divided by the wheel speed (W_SPEED) at 124 to compute the degree of wheel slip. The slip value is compared at 126 with a maximum permissible slip value set by the operator on slip control potentiometer 62. When actual slippage exceeds the selected maximum, a signal is produced on lead 127 which modifies the value in the main control loop so that the hitch is raised. This lifts the implement 10 relative to the ground so as to place a smaller load on the tractor, and this in turn reduces wheel slip.

The purpose of the drop rate velocity control circuit 128 is to limit the rate at which the hitch is lowered. This rate may be manually selected by the operator by adjusting the drop rate potentiometer 58. Circuit 128 continuously adjusts the valve "lower" command at 120 to maintain a desired hitch velocity. The operation of the drop rate velocity control circuit is explained in copending Application D. The drop rate velocity control function is inhibited when the implement is in contact with the ground so that the hitch may respond quickly and properly to the draft correction signal derived at 118. The compensated draft signal derived at 102 is applied over lead 140 to a comparator 130 where it is compared with a threshold value. When the draft signal exceeds the draft threshold value (the implement contacts the ground) the comparator produces a signal on lead 144 to inhibit drop rate velocity control circuit 128.

The external mode velocity control circuit 132 is responsive to output signals from the external fender switches 72, 74 for controlling the raising or lowering of the hitch under operator control at a constant velocity. This facilitates connection or separation of implements from the hitch. As explained in copending application C, circuit 132 regulates hitch movement according to an integral velocity control algorithm which provides consistent, slow and safe operation. The command issued to valve 44 is limited to maintain a constant rate of lift movement thereby compensating for variations in implement weight, system temperature, pilot pressure and valve performance.

The external mode velocity control circuit 132 is enabled only by moving the quadrant lever 50 forward beyond a detent position so as to generate the External Mode command. In FIG. 4, this operation is equivalent to a switch as illustrated at 134. When the system is in the External Mode, the feedback control loop is open and the output of the circuit 132 is applied to the height limit override circuit 118. The output of circuit 132 is disconnected from the height limit override circuit 118 and the closed loop restored by utilizing the raise/work switch 67 or otherwise capturing the hitch by moving the quadrant lever 50 to generate a position command corresponding to the current position of the hitch thereby terminating the External Mode command.

As previously explained, the automatic draft control system controls the hitch in response to position and draft feedback signals derived from the rock-shaft potentiometer 70 and the draft sensing pins 24. The system must be very sensitive to changes in the draft signal in order to achieve the desired level of responsiveness. However, the tractor with its pneumatic tires forms a spring-mass system so that a forward-aft pitching motion may result when the implement 10 is rapidly raised or lowered. This motion induces oscillating draft signals on the draft sensing pins 24. As the control system attempts to respond to these oscillating signals, the resulting hitch motion can propagate the pitching motion, the result being undesirable vibrations of the tractor. These vibrations may be overcome by low pass filtering the draft signal to a relatively low bandwidth during intervals when the operator is manually raising or lowering the hitch, and reverting to a more responsive (less heavily filtered) mode as the hitch approaches the desired position.

Figure 5:
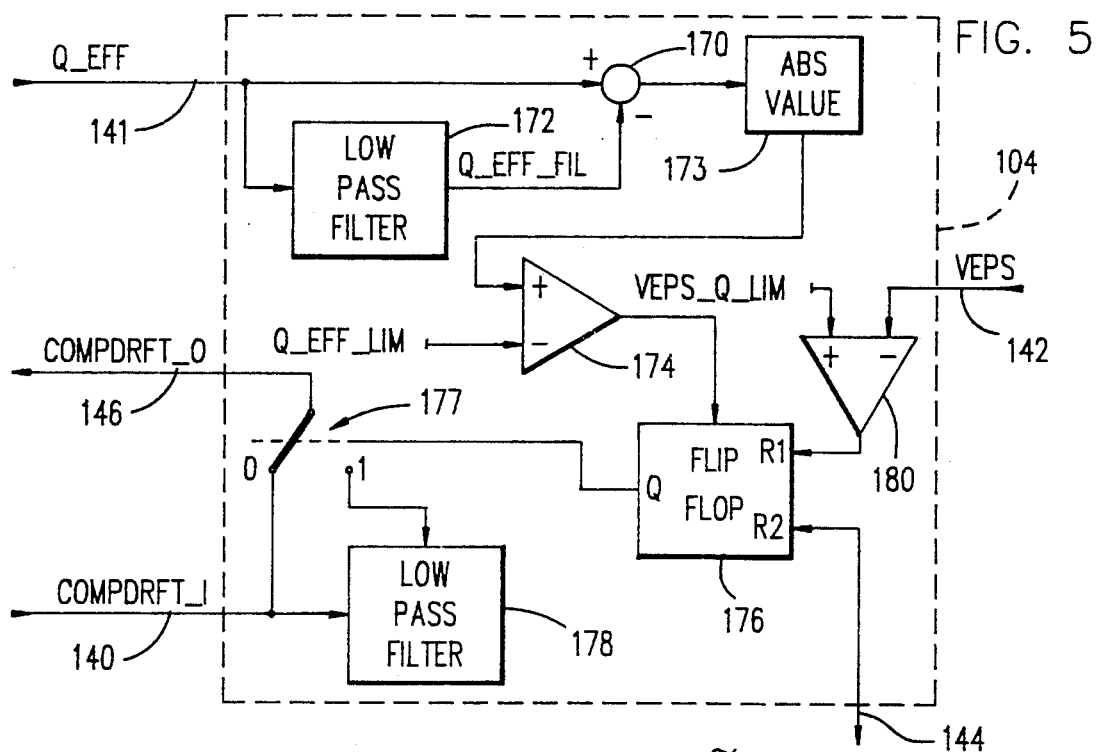
FIG. 5 is a diagram illustrating logic for heavily filtering draft feedback signals during intervals the hitch is being re-positioned above ground; and, FIG. 6 is a flow diagram illustrating a routine which may be executed by the microprocessor of FIG. 3 to carry out the logic illustrated in FIG. 5.

FIG. 5 illustrates the logic in draft sensitivity control circuit 104 for selectively changing the draft sensitivity by heavily filtering the composite draft signal COMPDRFT_I before applying it to subtractor 106 when the hitch positioning system is responding to quadrant lever movement commanding a change in hitch position. As shown in FIG. 5, the composite draft signal COMPDRFT_I, produced by the divider 102 of FIG. 4, is directly applied through a normally closed switch 177 to the lead 146. As shown in FIG. 4, lead 146 is connected to subtractor 106 in the hitch control loop. Thus, the signal COMPDRFT_I, which has already been filtered to remove frequencies above 3.2 Hz, is applied to the control loop as the signal COMPDRFT_O as long as switch 177 remains in the position shown. This is the normal condition of circuit 104 when the hitch position is under closed loop control and the operator does not move the quadrant lever 50.

The elements 170 and 172-174 comprise a means for detecting movement of quadrant lever 50. The quadrant lever output Q_EFF is applied directly to one input of subtractor 170 and through low pass filter 172 to a second input of the subtractor. The filter delays Q_EFF so the subtractor produces a positive or negative output depending on whether Q_EFF is increasing or decreasing. This output is also proportional to the rate of increase or decrease.

The output of subtractor 170 is then taken as an absolute value at 173 and applied to one input of a comparator 174 where it is compared with a threshold value Q_EFF_LIM. This threshold value is chosen so as to prevent small, slow movements of the quadrant le 50 from invoking heavy filtering of COMPDRFT_I since such quadrant lever movements do not result in large tractor pitching motions. However, if the output of the absolute value circuit 173 exceeds Q_EFF_LIM, comparator 174 produces an output signal to set an indicator illustrated as flip-flop 176.

When flip-flop 176 is set, it switches switch 177 so that the output of filter 178 is connected to lead 146. Filter 178 is a first order low pass filter which filters from the signal COMPDRFT_I those frequencies above 0.5 Hz. Thus, variations in the draft signals sensed at pins 24 as a result of apparent weight changes of the hitch and implement are filtered from COMPDRFT_I before it is applied to the subtractor 106 in the control loop.

Once the flip-flop 176 is set, it remains set until the hitch approaches the new position commanded by the quadrant lever. Referring to FIG. 4, the system error, that is, the difference between the position commanded by the quadrant lever and the actual hitch position, is represented by the absolute magnitude of the signal VEPS produced at the output of the height limit override circuit 118. The error signal VEPS is applied to one input of a comparator 180 in FIG. 5. A threshold value VEPS_Q_LIM is applied to a second input of the comparator. As the actual hitch position approaches the commanded position, VEPS drops to a value equal to or below VEPS_Q_LIM and comparator 180 produces an output signal to reset flip-flop 176. When the flip-flop is reset, switch 177 returns to the position shown in FIG. 5 so that COMPDRFT_I is again passed through the switch to become the signal COMPDRFT_O.

The flip-flop 176 has a second reset input which is derived from the comparator 130 of FIG. 4. As previously explained, this comparator produces an output signal when the implement 10 is in contact with the ground. When the implement is in the ground the system must be very sensitive to changes in the draft signal COMPDRFT_I hence circuit 104 is disabled by resetting flip-flop 176.

Figure 6:
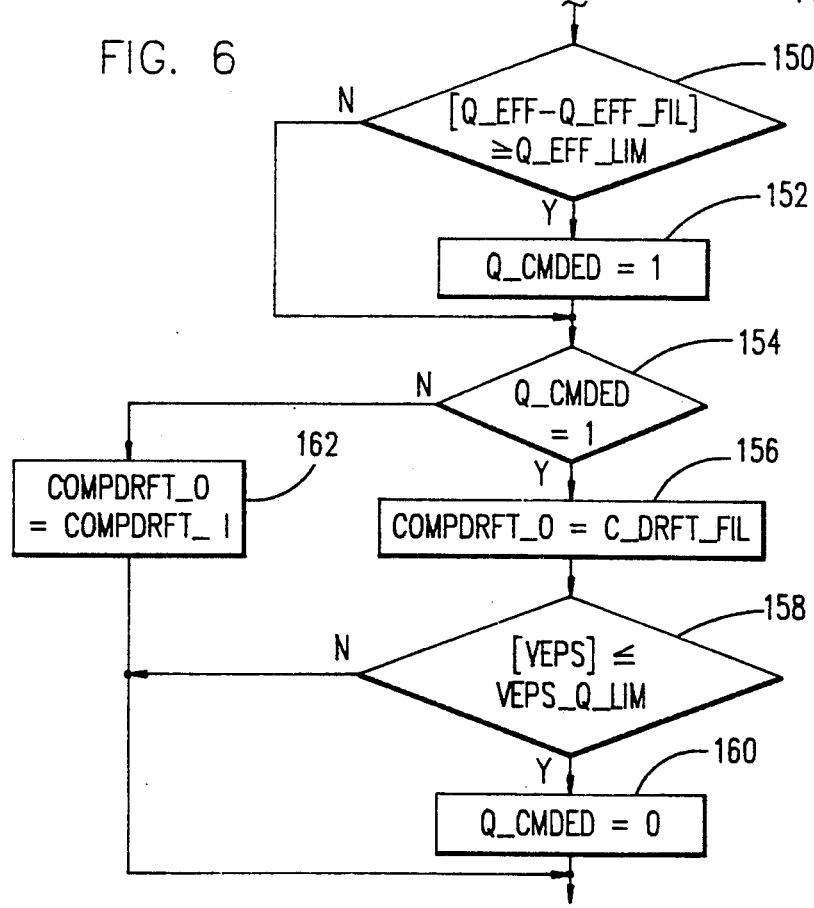

FIG. 6 illustrates a routine which may be executed by microprocessor 40 to provide the same draft sensitivity control as that provided by the logic of FIG. 5. In FIG. 6, step 150 corresponds to the functions performed by elements 170 and 172-174. If step 150 determines that the absolute magnitude of the difference between Q_EFF and Q_EFF_FIL is equal to or greater than Q_EFF_LIM then at step 152 an indicator Q_CMDED is set. This is equivalent to the setting of flip-flop 176.

At step 154 indicator Q_CMDED is tested to see if it is set. Since it was set at step 152, the test at step 154 proves true and the routine moves to step 156 where COMPDRFT_O is set to C_DRFT_FIL where C_DRFT_FIL is COMPDRFT_I low pass filtered to 0.5 Hz. In FIG. 5, this corresponds to the connection of the output of filter 178 through switch 177 to lead 146.

At step 158, the absolute magnitude of the error signal VEPS is compared with the limit value VEPS_Q_LIM and as long as VEPS is greater an exit is made from the routine. This corresponds to the output of comparator 180 failing to reset flip-flop 176.

Assuming movement of the quadrant lever 50 has ceased, the next time the routine is entered the test at step 150 proves false and the routine branches directly to step 154. Since Q_CMDED is still set, COMPDRFT_O is again made equal to C_DRFT_FIL at step 156 and VEPS is tested at step 158. An exit is again made from the routine from step 158 if the test at step 158 proves false.

Assuming no further movement of the quadrant lever, the feedback loop is continuously adjusting the hitch position to that commanded by the quadrant lever signal. During this interval steps 150, 154, 156 and 158 are repeatedly executed with the magnitude the error signal VEPS becoming progressively smaller as the hitch approaches the commanded position. Eventually, VEPS becomes equal to or less than VEPS_O_LIM and the test at step 158 proves true. Q_CMDED is reset to zero at step 160 before an exit is made from the routine. Assuming no further movement of the quadrant lever, the next time the routine is executed the tests at steps 150 and 154 both prove false. The routine branches to step 162 wherein COMPDRFT_O is made equal to COMPDRFT_I. In FIG. 5, this is equivalent to returning switch 177 to the position shown.

From the foregoing description it is seen that the present invention provides a simple and inexpensive method and apparatus for reducing pitching motion of a tractor during raising and lowering of a hitch. However, it will be understood that the invention is not limited to use with tractor-mounted hitches but may be utilized in other systems wherein a feedback loop controls movement of a load to a position commanded by a manual control lever. It is intended therefore to be limited only by the scope of the appended claims.

The invention in which an exclusive property or privilege is claimed is defined as follows:

1. In an automatic draft control system for controlling the movement of a vehicle-mounted hitch supporting a tillage implement to a position commanded by a draft command signal, said system including draft sensing means for producing a draft feedback signal representative of hitch draft, error determining means responsive to said draft command signal and said draft feedback signal for producing a position error signal, and means responsive to said position error signal for moving the hitch toward the position commanded, the improvement comprising:
   draft sensitivity control means responsive to changes in said draft command signal for low pass filtering said draft feedback signal before it is applied to said error determining means; and,
   means for inhibiting said low pass filtering of said draft feedback signal when said implement is in contact with the ground.

2. The improvement as claimed in claim 1 wherein the draft sensitivity control means includes a first order low pass filter means with a cut-off frequency of 0.5 Hz and said filter means is responsive to said draft feedback signal for supplying to the error determining means a low pass filtered draft feedback signal.

3. In an automatic draft control system for controlling the movement of a vehicle-mounted hitch to a position commanded by a draft command signal, said system including draft sensing means for producing a draft feedback signal representative of hitch draft, error determining means responsive to said draft command signal and said draft feedback signal for producing a position error signal, and means responsive to said position error signal for moving the hitch toward the position commanded, the improvement comprising:
   draft sensitivity control means responsive to changes in said draft command signal for low pass filtering said draft feedback signal before it is applied to said error determining means, said draft sensitivity control means including
   first means responsive to said draft command signal for setting an indicator when said draft command signal changes; and,
   second means for supplying the low pass filtered draft feedback signal to the error determining means only while said indicator is set,
   the second means supplying the draft feedback signal directly to said error determining means while said indicator is not set.

4. The improvement as claimed in claim 3 wherein said draft sensitivity control means includes means for resetting said indicator when said position error signal drops below a threshold value.

5. The improvement as claimed in claim 3 wherein said first means includes means for determining the rate of change of said draft command signal, and means for setting said indicator only if the rate of change of said draft command signal exceeds a threshold value.

6. The improvement as claimed in claim 3 wherein said second means includes a low pass filter with a cut-off frequency of about 0.5 Hz, said filter being responsive to said draft feedback signal for producing said low-pass filtered draft feedback signal, said second means further including means responsive to said indicator for selectively applying the low-pass filtered draft feedback signal from said low pass filter to the error determining means.

7. The improvement as claimed in claim 6 wherein said draft sensitivity control means includes means for resetting said indicator when said position error signal drops below a threshold value.

8. The improvement as claimed in claim 6 wherein said first means includes means for determining the rate of change of said draft command signal, and means for setting said indicator only if the rate of change of said draft command signal exceeds a threshold value.

9. The improvement as claimed in claim 8 wherein said hitch supports a tillage implement, and means for resetting said indicator when the implement is in contact with the ground.

10. In a system for controlling positioning of a hitch supporting an implement, said hitch being mounted on an vehicle having pneumatic tires whereby said vehicle bounces as said hitch is rapidly moved while the implement is above ground, said system including means for producing a command signal to represent a desired position of the hitch, and a feedback loop including draft sensing means for sensing the draft on the hitch and producing a draft signal and error determining means responsive to the draft signal and the command signal for producing an error signal for controlling movement of the hitch, a method of eliminating vehicle vibrations during movement of the hitch while the implement is above ground, said method comprising:
low pass filtering the draft signal before applying it to the error determining means to eliminate therefrom signal variations caused by the weight of the hitch and implement variably acting on the draft sensing means as the vehicle bounces said low pass filtering of the draft signal being initiated only when the rate of change of the command signal exceeds a threshold value.

11. The method as claimed in claim 10 wherein the filtering of the draft signal is terminated as the hitch position approaches the desired position.

12. The method as claimed in claim 10 wherein the draft signal is filtered only when there is no contact between the implement and the ground.

13. The method as claimed in claim 10 wherein the step of low pass filtering the draft signal comprises passing said draft signal through a first order low pass filter having a cut-off frequency of 0.5 hz.

* * * * *